United States Patent
Ezquerra

[11] 3,722,951
[45] Mar. 27, 1973

[54] VEHICLE PASSENGER SAFETY DEVICE

[76] Inventor: Raymond Ezquerra, 25 Place Nicolas Freimeaud, Tours, France

[22] Filed: June 3, 1971

[21] Appl. No.: 149,684

Related U.S. Application Data

[63] Continuation-in-part of Ser. No. 876,375, Nov. 13, 1969, abandoned.

[52] U.S. Cl. .............................297/390, 280/150 SB
[51] Int. Cl. ................................................A47c 31/00
[58] Field of Search ....297/216, 284, 396; 280/150 B

[56] References Cited

UNITED STATES PATENTS 3,262,716   7/1966   Graham.........................297/390 X Primary Examiner—James C. Mitchell
Attorney—Jordan B. Bierman

[57] ABSTRACT

A device for protecting a passenger of an automotive vehicle in case of crash, accident and the like, this device comprising a bow-shaped element of which the intermediate portion is adapted to be disposed in front of the trunk of the person to be protected, and the side branches of the element extend to the rear and are pivoted to the upper portion of the seat, for example to a head-rest. Thus, in case of sudden forward projection of the passenger's or driver's trunk, the shoulders of the protected person will exert a certain pressure against the lateral branches of the device, thus causing the latter to pivot upwards to a position in which the head of the person is safely retained.

10 Claims, 12 Drawing Figures

Patented March 27, 1973

Raymond Ezguerra, INVENTOR

Bierman & Bierman, ATTORNEYS.

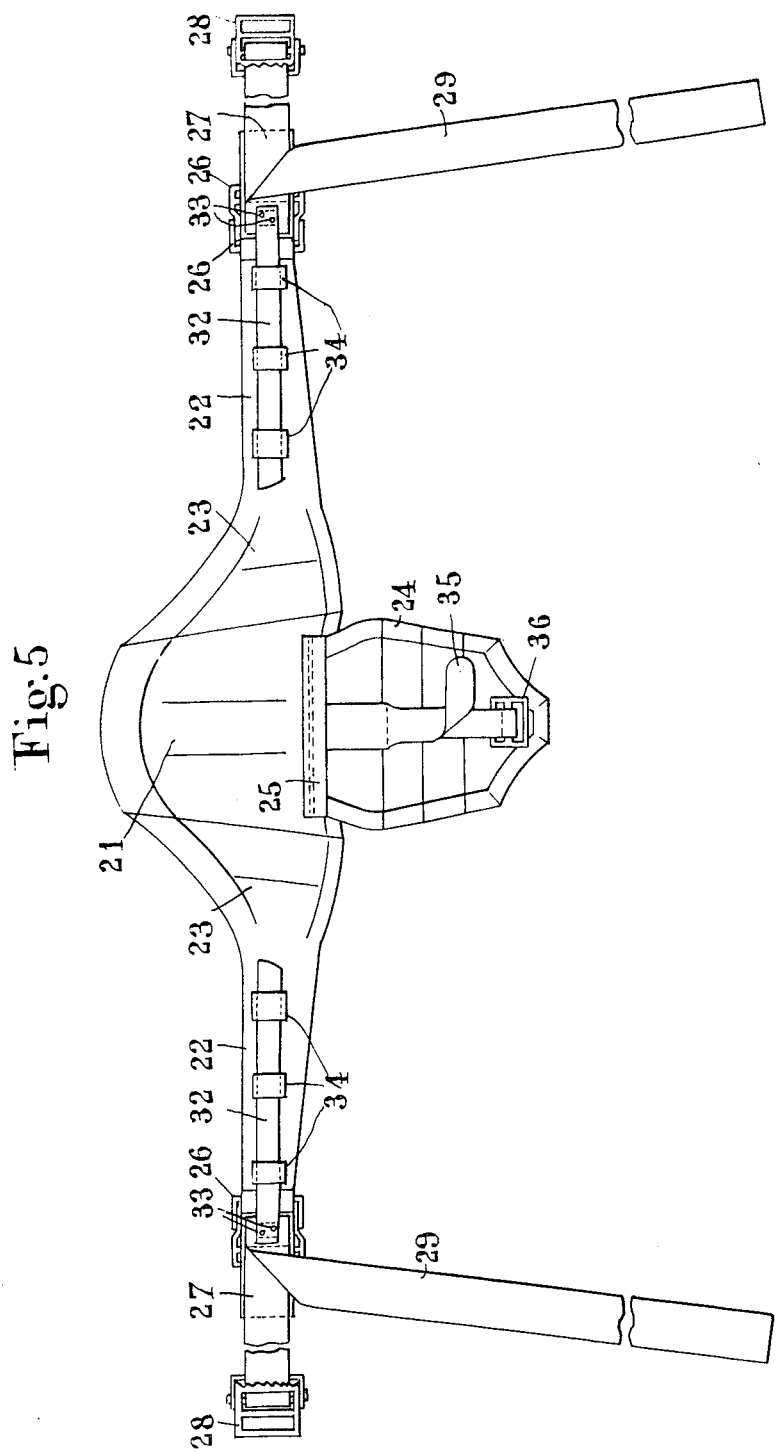

Patented March 27, 1973

Raymond Ezguerra, INVENTOR
Bierman & Bierman, ATTORNEYS

Patented March 27, 1973

Raymond Ezguerra, INVENTOR

Bierman & Bierman, ATTORNEYS

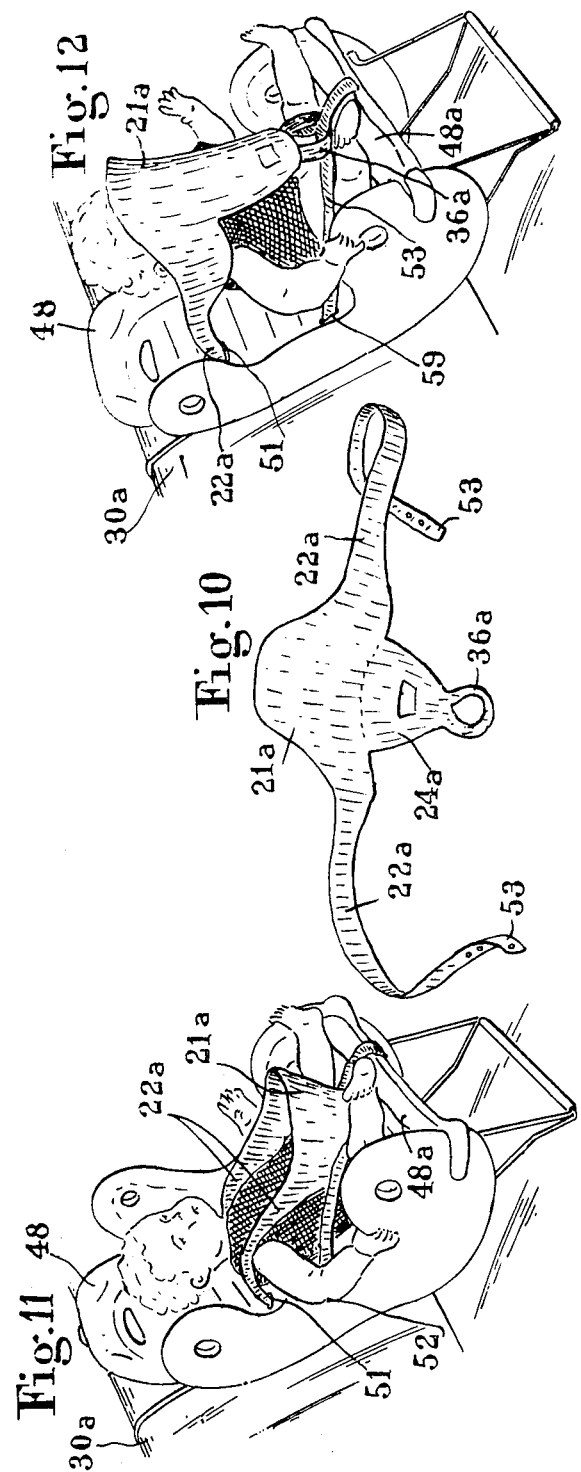

VEHICLE PASSENGER SAFETY DEVICE

BACKGROUND OF THE INVENTION

The present invention is a continuation in part application of my copending application Ser. No. 876,375 filed on Nov. 13, 1969 and now abandoned.

The present invention relates to safety devices provided within vehicles for protecting each passenger, including the driver, in case of front shock or sudden collision with an obstacle.

DESCRIPTION OF THE PRIOR ART

Devices of this type consist as a rule of safety belts or harnesses. The function of these known devices is to retain the trunk of the passenger to be protected in order to prevent him from being thrown forwards.

However, due to their inherent designs, these belts or harnesses are not capable of warranting a complete safety. In fact, the passenger's or driver's head is not held against a sudden forward movement, and it is known that a sudden forward projection may cause severe and frequently lethal lesions, even if the trunk is held against the backrest. Besides, these safety belts and harnesses cannot give the passengers any protection against shocks.

Under these condition, it is the essential object of this invention to provide a novel protection device designed with a view to give a greater safety to the user. To this end, this device comprises a bow-shaped element of which the intermediate portion is adapted to be disposed in front of the trunk of the person to be protected, and the side branches of the element extend to the rear and are pivoted to the upper portion of the seat, for example to a head-rest.

Thus, in case of sudden forward projection of the passenger's or driver's trunk, the shoulder of the protected person will exert a certain pressure against the lateral branches of the device, thus causing the latter to pivot upwards to a position in which the head of the person is safely retained.

SUMMARY OF THE INVENTION

However, this element is also designed with a view to protect the head of the passenger or driver of a vehicle, in case of crash, for example as a consequence of the distortion of the bodywork. To this end, this element consists of a substantially bow-shaped member having its intermediate portion adapted to be normally disposed in front of the user's chest and its side arms disposed on either side of the position occupied by the user's chest, pivot means provided at the ends of said side arms permitting the movement thereof in vertical planes. The arrangement is such that said side arms extend normally in front of the user's shoulders, whereby in case of forward movement of the user's chest as a consequence of a sudden stoppage, the user's shoulders can exert a pressure against side arms so as to raise same.

According to an advantageous form of embodiment the present protection device consists of a kind of apron having a relatively great surface area, made of flexible or semi-flexible material, including the side arms thereof which constitute suspension straps or suspenders pivoted to their point of attachment, a stiffening member being advantageously inserted in each suspension strap or suspender, notably in the portion thereof overlying the user's shoulders.

Preferably, this protection apron or at least said suspension straps or suspenders are made from a suitable extensible material. Thus, in case of shock or crash, the resulting forward movement of the user to be protected is somewhat damped, thus avoiding the inconveniences likely to arise from a too sudden stoppage of this movement.

However, other features and advantages characterizing or afforded by the protection device of this invention will appear as the following description of a few specific and preferred forms of embodiment proceeds. This description is given with reference to the attached drawings, by way of illustration. In the drawings:

BRIEF DESCRIPTION OF THE DRAWINGS:

FIG. 5 is an elevational view of a different form of embodiment of the device;

FIG. 10 is a front elevational view showing another modified form of embodiment specially intended for protecting a baby in a car;

FIGS. 11 and 12 are perspective views showing the manner in which the device of FIG. 10 is used and its mode of operation.

Figure 1:
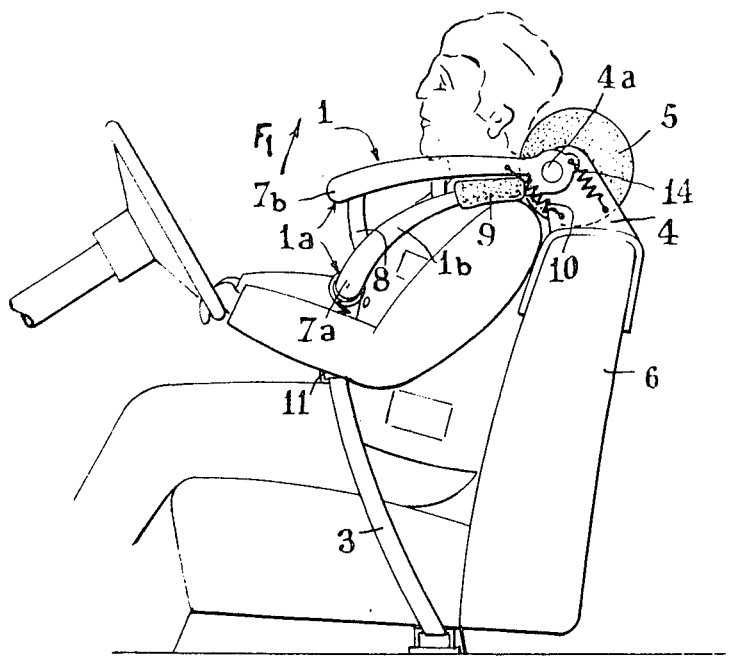
FIG. 1 is a side elevational view illustrating the protection device of this invention, associated with the seat of an automotive vehicle.
Figure 4:
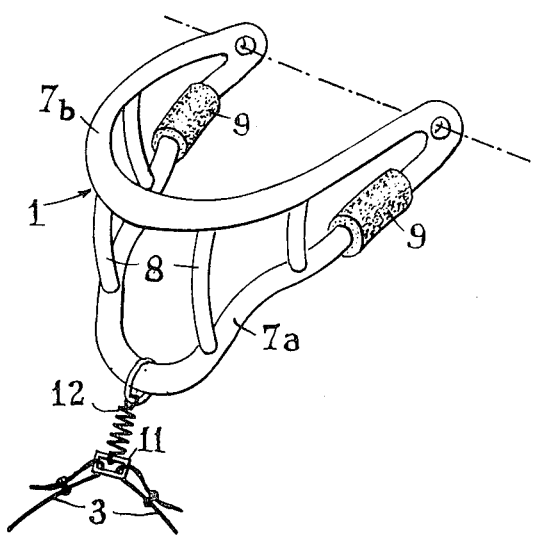
FIG. 4 is a perspective view of the protection device proper.
Figure 2:
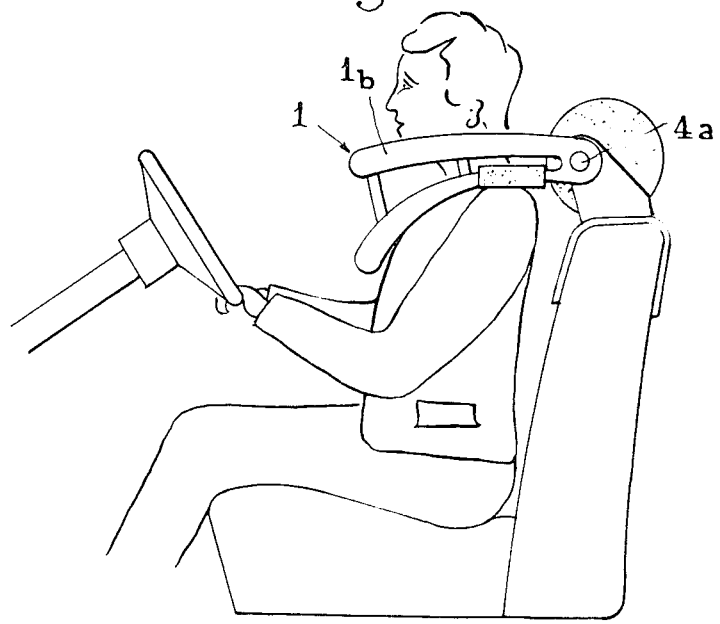
FIGS. 2 and 3 are similar views showing the mode of operation of this device.

DESCRIPTION OF THE PREFERRED EMBODIMENTS.

In the example illustrated in FIGS. 1 to 4 of the drawings the protection device according to this invention has the general configuration of a bow and is denoted by the reference numeral 1. The central or intermediate portion 1a of this bow is adapted to be disposed transversely and substantially horizontal in front of the user to be protected, and its side arms or branches 1b extend backwards in the longitudinal direction, on either side of the user.

At their free ends these side arms 1b are pivoted to a pair of aligned horizontal pins 4a disposed substantially at the rear of the neck of the person to be protected.

This pair of pivot pins may advantageously be carried by a common support consisting for example of an accessory 4 comprising a head-rest cushion 5 for the person to be protected. This accessory is then so designed and constructed that it can fit to the upper edge of the back of the corresponding seat 6.

The protection element 1 consists essentially of a pair of superposed bows 7a and 7b of semi-rigid material.

These two superposed bows are somewhat spaced at their front portions, with the side branches converging to the rear end, i.e., toward each pivot pin of the corresponding element.

Furthermore, these two bows may be braced with each other by means of a number of distance-pieces 8. Besides, a wall of flexible and transparent material may be disposed between these two bows in order to fill up the space left therebetween.

The general configuration of the element thus obtained is such that this element can be disposed in front of the chest of the person to be protected, as illustrated in thick lines in FIG. 1.

However, it should be noted that in this position a certain gap is left between the chest of this person and the protection element, so that the latter cannot interfere with the normal movements of the person to be protected.

The relative spacing of the lateral branches 1b of the bow of the protection device is such that said branches lie normally ahead of the shoulders of the person to be protected. Furthermore, the lower bow 7a of the device carries a pair of movable tubular members 9 adapted to act somewhat as shoulder pads to the person to be protected when the device 1 is in its normal operative position. Besides, a spring 10 may advantageously be provided for urging the device 1 in this position. It may also be noted that in this position the visibility of the user is not impaired; under these conditions, no interference is caused to a driver by this element 1 disposed in front of him.

In case of sudden stoppage against an obstacle, or if the vehicle receives a forward shock in case of crash, the chest or trunk of the person to be protected is thrown forwards, of course. Under these conditions the shoulders of this person will exert a certain pressure against the tubular shoulder pads 9 of the protection bow.(see FIG. 2)

Figure 3:
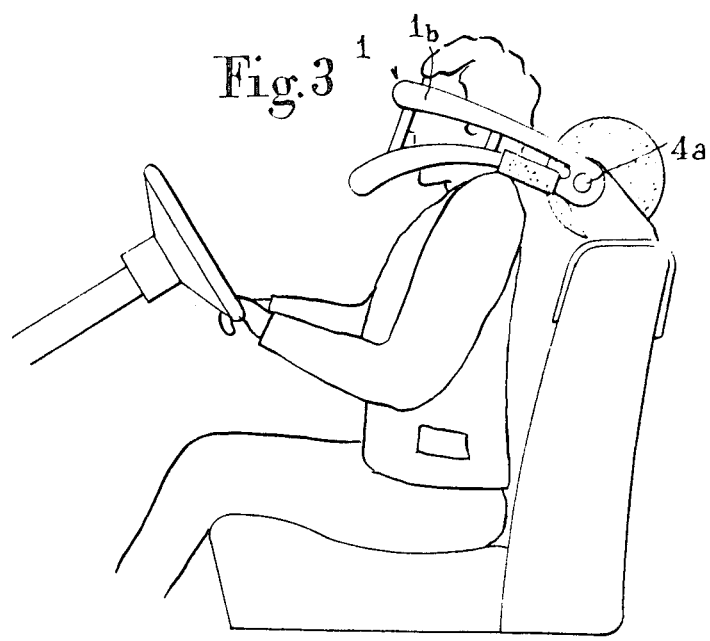

Thus, the element 1 is caused to pivot upwards in the direction of the arrow $F_1$, to a position shown in the FIG. 3, adequate stops being provided for stopping the device in this position. Now in this upper position the pivoting element 1 constitutes somewhat of a protection plastron capable of jointly retaining the user's head against being thrown forwards and protecting the head thus retained against shocks likely to take place in the same direction, for example in case of dislocation or distortion of the vehicle body.

The pivoting element 1 is capable of performing this second function because it actually constitutes a protection plastron or cage surrounding the lower portion of the head with a relatively considerable play. Now, the frame structure of this cage consists of semi-rigid bows adapted to withstand relatively severe shocks while undergoing a certain deformation, thus ensuring an efficient damping of the effect produced by these shocks.

To this end, the bows 7a and 7b may be made from any suitable material. However, they can also consist of inflatable soft-walled tubes. In this case, of course, the distance-pieces 8 will be made in a similar manner. Possibly, the flexible and/or transparent wall provided between the two bows may consist likewise of an inflatable panel; on the other hand, the front portion of each bow may also comprise a preferably polarized screen, retractable or not, for protecting the driver against dazzling.

Since the shoulder pads 9 are movable, their positions can be adjusted as a function of the breadth and stoutness of the person to be protected.

By virtue of its pivotal mounting the bow of the device can be pivoted to its rearmost position, when the element is not in actual use. This element is adapted to be retained in this position by the adjustable spring 10, which has thus a twofold function. When a person occupies the seat 6, it is only necessary to tilt the device 1 forwards for obtaining an operative or normal position thereof, in which the device is ready to perform its protective role.

However, this element may also be left in the fully retracted or rear position. In fact, in case of front shock or sudden stoppage, it will automatically move to its operative position by tilting forwards, by inertia.

This element is advantageously utilized in combination with a pair of lower holding straps 3 adapted to be disposed upon the thighs of the person to be protected. These straps may in this case be attached to a ring 11 connected via a spring 12 or any other suitable resilient member to the front portion of the lower bow 7a of element 1. These springs 12 and other ancillary members are advantageously coated or lined with adequate damping or shock-absorbent material.

Under these conditions, both straps 3 are adapted to retain the person to be protected in his seat 6 in case the vehicle overturned. However, these straps do not interfere with the upward tilting movement of element 1 to its useful position, due to the provision of spring 12. In any case, any other suitable means may be provided for interconnecting these straps without interfering with the operation of the protection element 1.

Both straps 3 may also be replaced by equivalent and adequate retaining means, for example a strap disposed between the user's legs, or a harness.

In the modified form of embodiment illustrated in FIGS. 5 to 9 of the drawings the protection device according to this invention comprises an apron 21 of relatively great surface area, formed on either side with relatively long extensions 22 constituting each a suspension strap or suspender. These suspenders are adapted to constitute the lateral arms of the protection device of which the central portion is the aforesaid apron 21.

This apron 21 consists of flexible or semi-flexible material having however a sufficient strength. The same applies to the suspenders 22. Suitable materials for making these apron and suspenders are for instance leather, cloth, and notably textile cloth coated with plastic material.

However the apron 21 or at least its suspenders 22 will consist preferably of an extensible or partially extensible material. If it is preferred to use a non-extensible sheet material for making the apron 21 and its suspenders 22, the necessary extensibility may be imparted thereto by anchoring them to the seat of the vehicle through extensible and possibly elastic attachments.

Moreover, the apron 21 comprises an internal padding for protecting the user's head. A similar padding is provided in the side portions 23 of this apron.

Instead of a padding, the apron 21 may comprise one or a plurality of inflatable elements capable of ensuring an efficient protection.

At its lower portion, the apron 21 may comprise a flap 24 of flexible material, with a suitable protection padding. This flap 24 is secured to and along the lower edge of apron 21 by means of a flexible strap 25 constituting a kind a hinge mounting permitting of folding said flap 24 against the front face of apron 21.

At their rear ends the suspenders 22 are attached by means of a buckle 26 to a relatively short strap 27 provided in turn at its opposite end with another anchoring buckle 28. However, a strap 29 of considerably greater length is secured to each short strap 27 to permit the mounting of the device to the backrest 30 of a seat 31 of the automotive vehicle, as clearly illustrated in FIG. 6.

This mounting is easily accomplished by simply disposing the pair of straps 29 around the backrest 30, these straps 29 being inserted between the backrest 30 and the seat 31. The ends of the straps 29 are then secured to the short straps 27 by means of the anchoring buckles 28. However, the buckles 26 should preferably be positioned at or near the top of the backrest 30 (see FIG. 6).

Figure 7:
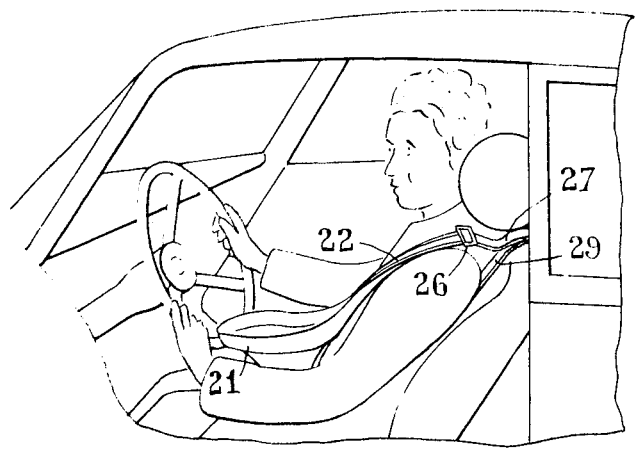
FIGS. 7 and 8 are perspective views showing the manner in which the embodiment of FIG. 5 is used, and its mode of operation.

As illustrated in FIG. 7 the apron 21 is thus disposed transversely in front of the user's trunk, when the user is normally seated. As to the suspenders 22, they rest on the user's shoulders and their function is to keep the apron 21 in position.

Obviously, the presence of this apron 21 is not a source of discomfort to the user who can move freely, even if he is the driver of the vehicle. Moreover, this apron 21 is located at a level low enough to avoid any interference with the driver's vision.

Preferably, the stiffening members consist of inserts added to the suspenders 22. These inserts may consist for example of a pair of thin blades 32 of rigid or semi-rigid material. These blades are secured at one end for example by means of rivets 33 to both belts or short straps 27. On the other hand, these blades are inserted through a plurality of keepers 34 carried by the front face of each suspender 22.

Notwithstanding the presence of said stiffening blades 32 the suspenders 22 are hinged freely at their rear ends due to the flexibility of the anchoring straps 27. Under these conditions, these suspenders can "pivot" in relation to the top portion of backrest 30 without resorting to any particular pivot pin mounting or the like, in contrast to the form of embodiment shown in FIGS. 1 to 4. Therefore, this form of embodiment of the device (FIGS. 5 to 9) constitutes a considerable constructional simplification and it is more economical while providing the same advantageous characteristics.

Figure 8:
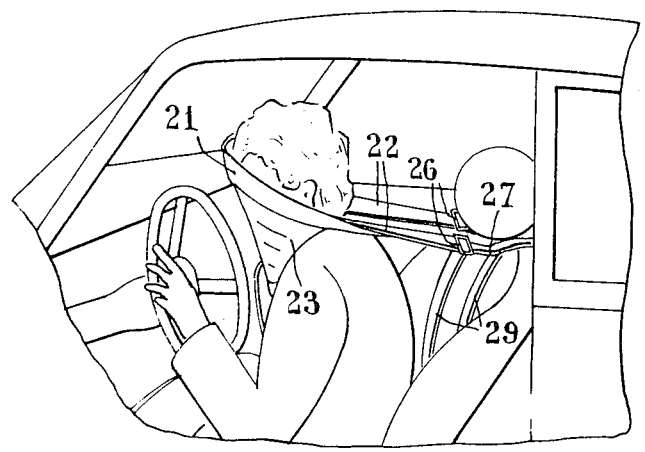

The function of blades 32 is to stiffen the side suspenders 22 along the portions thereof passing over the user's shoulders, so that these suspenders can efficiently and safely perform their function in case of sudden stoppage of the vehicle. In fact, in this case the trunk of the person to be protected is thrown forwards with force and the user's shoulders lift the suspenders 22, thus causing the apron 21 to be raised until it is positioned in front of the user's head as illustrated in FIG. 8. In this position, the apron will safely retain the user's head and prevent it from being thrown against the steering wheel or the windshield of the vehicle, or any other dangerous element thereof.

In this respect, it may be noted that, since the apron consists of flexible material and has a relatively great surface area, any possibility of doing any harm to the user's face in case of shock therewith is definitely precluded. In fact, in this case, the apron accomodates the configuration of the user's face. On the other hand, the contact pressure is distributed over a considerable surface.

Moreover, if the apron 21 and/or its shoulder straps or suspenders 22 are made from extensible material, this apron is moved forwards by the pressure exerted by the user's face. Under these conditions, any sudden stoppage of the head movement is avoided to permit a substantially gradual damping out of the inertia of the head thus projected forwards. If the apron 21 and its suspenders 22 consist of non-extensible material, the same result may be obtained by providing extensible attachments for the suspenders, or alternately by interposing one or more springs or other resilient members either across the width of the suspension straps or suspenders 22 or at the points of anchorage thereof to the seat.

Finally, due to the padding thereof, the apron 21 and its side portions 23 protect at the same time the user's head against accidental shocks. This is also true in case the apron 21 consists of an inflatable element.

Figure 6:
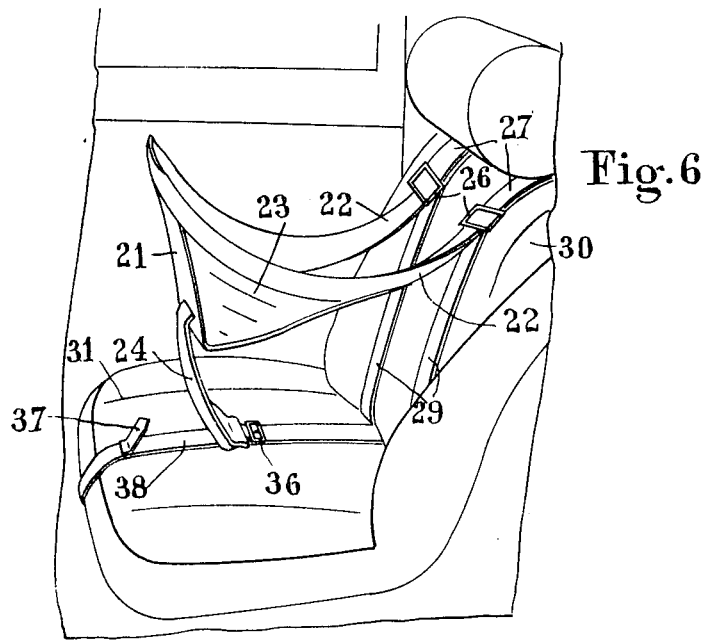
FIG. 6 is a perspective view showing the mounting of the embodiment of FIG. 5 on a vehicle seat.

The protection thus obtained is also completed by the aforesaid flap 24. To this end, this flap 24 is adapted to be folded downwards as shown in FIG. 6, and attached by means of a strap 35 and a buckle 36 to a belt 37 extending between the user's legs (if the user is a man) and secured to a strap 38 disposed around the corresponding seat 31.

If the user is a woman, the flap 24 may be attached at its lower end to a protection harness or belt, or to a retaining strap extending transversely above the user's thighs and attached to both sides of the seat.

Figure 9:
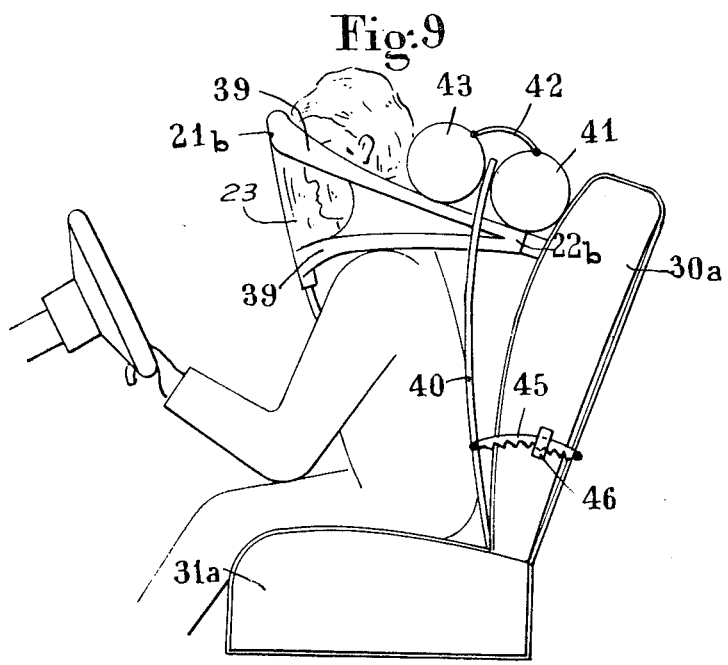
FIG. 9 is a side elevational view of a modified form of embodiment of the device.

FIG. 9 illustrates an advantageous alternate form of embodiment of this device. In this structure the protection apron 21b comprises a screen or shield 23 of flexible transparent material, for example plastic material, adapted to be disposed in front of face of the person to be protected in case the head of this person were projected forwards with force as a consequence of a shock or crash. Thus, the user preserves a sufficient visibility while being duly protected and retained. Additionally, the upper and lower edges of apron 21b may comprise in this case padded beads 39 interconnected to constitute the corresponding lateral suspenders 22b attached to the harness or belts surrounding the backrest 30a.

However, the essential improvement characterizing this modified form of embodiment lies in the fact that a movable ancillary backrest 40 adapted to be interposed between the back of the user to be protected and the actual backrest 30a of the seat is provided. This ancillary backrest 40 is relatively thin and adapted to pivot freely at its lower edge or end in order to follow the forward movement accomplished by the user's trunk in case of fierce shock, as shown in FIG. 9.

However, there are also provided in combination with this ancillary backrest means adapted, in case of front crash, to lock this ancillary backrest in its forward pivoted position, in order to prevent the return backward movement of the user's trunk, by reaction.

These means will safely prevent any accident likely to be originated by this undesired backward reaction movement.

The means provided for preventing the ancillary backrest 40 from receding after a forward movement may consist simply of a movable locking "roll" 41 attached by means of a flexible cord 42 to a cushion-forming roll 43 acting as a head-rest and secured in turn to the upper end of the ancillary backrest 40. In the inoperative condition the locking roll 41 lies somewhat in a position of equilibrium on the top of cushion 43. Under these conditions, when this cushion 43 is moved forwards, the roll 41 falls behind the head-rest 43 as shown in FIG. 9. However, this locking roll 41 could as well be attached to the upper end of the normal backrest 30a by means of a strap, harness or any other suitable member.

These means for retaining the ancillary backrest 40 may also consist of a rack 46 attached to the backrest 40 and co-acting with a pawl disposed in a keeper 47 secured to the corresponding side of the standard backrest 30a.

Possibly, the retaining ancillary backrest provided as described hereinabove for preventing an undesired backward movement of the user's head may consist of the standard backrest proper (30 or 30a) of the corresponding vehicle seat, provided that this backrest is pivotally mounted at its lower end and that adequate locking means are provided to prevent it from moving backwards subsequent to a forward projection due to a sudden stoppage.

Of course, the protection device according to this invention may be constructed in various sizes to constitute a convenient protection device for adults, or children, or even babies. Besides, FIGS. 10 to 12 illustrate a modified form of embodiment of this device specially intended for protecting a baby. This device consists as in the preceding examples of an apron 21a of flexible material, provided with suspenders 22a. At its lower end, this apron carries a flap 24a ending with a loop or ring 36a.

This device can easily be adapted to a baby's seat 48 adapted in turn to be secured through any suitable means to the backrest 30a of an automotive seat or to any other vehicle seat. The device is fitted to be existing seat by simply inserting the suspenders through slots 51 and 52 formed to this end in the seat backrest.

The length of the end portions 53 of these suspenders is sufficient to permit the forwards bending thereof for engaging them through another slot formed in the front edge 48a of the baby's seat. Thus, the two end portions 53 are assembled by means of a suitable buckle (not shown) after having passed these portions through the ring 36a carried by the flap 24a of the protection apron (see FIG. 12).

With the present device thus mounted to the baby's seat the protection apron extends in front of the baby's body and the suspenders 22a rest on his shoulders (FIG. 11). Under these conditions, in case of sudden stoppage of the vehicle the baby's body is thrown forwards so that his shoulders will lift the suspenders 22a. This movement is attended of course by the upward movement of the apron 21a which is thus positioned in front of the baby's face and chest, as shown in FIG. 12.

It is clear that this device for protecting a baby operates exactly like the device for adults which has been described hereinabove.

Of course, the present protection device may be used in any desired vehicles, outside motor cars, for example in aircrafts or boats.

What I claim is:

1. A device for protecting the passenger of a vehicle in case of sudden stoppage, crash or similar accident, which comprises a substantially bow-shaped member having its intermediate portion adapted to be normally disposed in front of the user's chest and its side arms disposed on either side of the position occupied by the user's chest, pivot means provided at the ends of said side arms to permit the movement thereof in vertical planes, the arrangement being such that said side arms extend normally in front of the user's shoulders, whereby in case of forward movement of the user's chest as a consequence of a sudden stoppage, the user's shoulders can exert a pressure against said side arms so as to raise same.

2. Protection device as set forth in claim 1, which further comprises a support adapted to be secured to the upper portion of the vehicle seat, means for pivoting the side arms of said bow-shaped protection member being provided on said support.

3. Protection device as set forth in claim 1, wherein said bow-shaped protection member consists of a kind of apron having a relatively great surface area and is made from suitable flexible material so that it can be shaped to the desired configuration, a stiffening member being inserted in the side arms of said member to constitute suspenders, notably in the portions thereof overlying the user's shoulders.

4. Protection device as set forth in claim 3, wherein said protection apron is made from an extensible material.

5. Protection device as set forth in claim 3, wherein said means for anchoring said suspenders to said protection apron are extensible.

6. Protection device as set forth in claim 3, wherein the pair of suspenders of said protection apron are attached to straps adapted to be secured around the backrest of a vehicle seat.

7. Protection device as set forth in claim 3, wherein said protection apron is padded and carries at its lower portion a flap adapted to be attached to a strap anchored in turn to the lower portion of said seat.

8. Protection device as set forth in claim 3, wherein said protection apron consists at least partially of a plurality of inflatable elements.

9. Protection device as set forth in claim 3, wherein said protection apron comprises a transparent, flexible shield.

10. Protection device as set forth in claim 3, which comprises in combination with said protection apron a backrest adapted to pivot forwards with the trunk of the person to be protected, in case of sudden stoppage or crash of the corresponding vehicle against an obstacle, locking means being provided for preventing the subsequent backward movement of said backrest.

* * * * *